T. C. SPELLING.
MONORAILROAD.
APPLICATION FILED FEB. 27, 1915.
1,140,412.
Patented May 25, 1915.
2 SHEETS—SHEET 1.
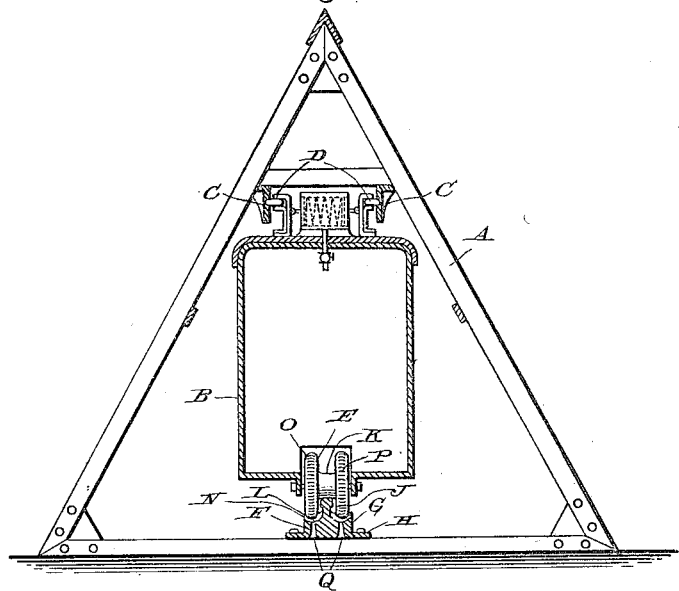
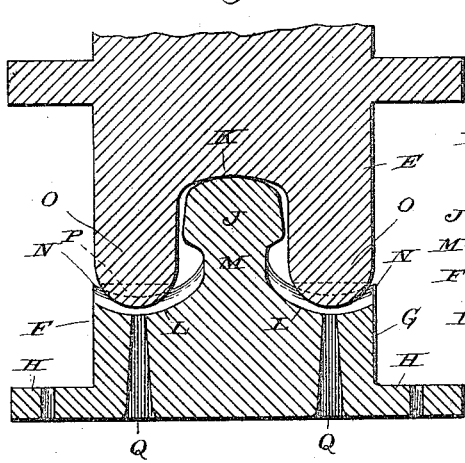
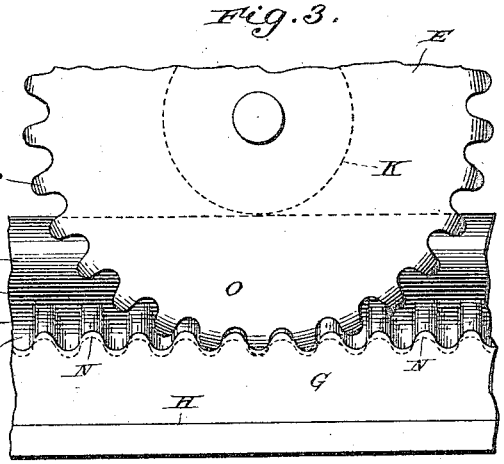
Witnesses:
Inventor:
Thomas C. Spelling

UNITED STATES PATENT OFFICE.

THOMAS C. SPELLING, OF NEW YORK, N. Y.

MONORAILROAD.

1,140,412.

Specification of Letters Patent.

Patented May 25, 1915.

Application filed February 27, 1915. Serial No. 10,966.

*To all whom it may concern:*

Be it known that I, THOMAS C. SPELLING, a citizen of the United States, residing at New York city, in the county of New York and State of New York, have invented certain new and useful Improvements in Mono-railroads, of which the following is a specification, reference being had therein to the accompanying drawings.

This invention relates to improvements in mono-railroads of the general type suggested in my Patents Nos. 1058481 of April 8, 1913 and 1105540 of July 28, 1914.

The object of the present invention is primarily to provide for use in a mono-railroad system, though capable of service elsewhere, an improved combination of traction wheel and rail designed to assist in overcoming possible objections flowing from the travel of a car over regions including steep grades, as in ascending a hill, either in a straight inclined plane or by a circuitous route.

In the construction exemplified in my above mentioned patents, the rail therein employed had a smooth tread and the traction wheel both smooth periphery and flanges. This construction is obviously, at all times, desirable in approximately level country, or where but relatively slight inclinations are encountered, and my present aim is to maintain this desideratum while at the same time improve the coöperating elements, so that, as distinguished from the mere frictional traction engagement, I obtain an interlocking or positive traction engagement between the wheel and rail when traveling up severe inclines.

An ancillary feature of the invention embraces the provision of means enabling relative bodily shifting of the traction wheel laterally of its rail,—as when the car sways in turning curves,—while retaining a positive or interlocking traction engagement between the wheel flange, or flanges, and complementary portions of the rail member.

The foregoing and other advantageous characteristics of my improvements will more fully appear from the detailed description hereinafter presented, when read in connection with the accompanying drawings forming part hereof, and wherein several preferred embodiments of the invention are illustrated.

Figure 4:
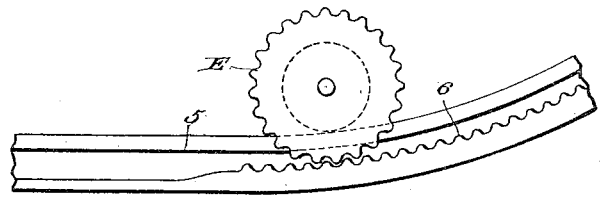
Figure 5:
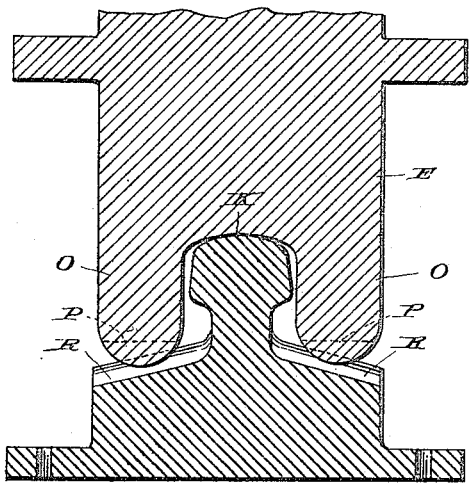
Figure 6:
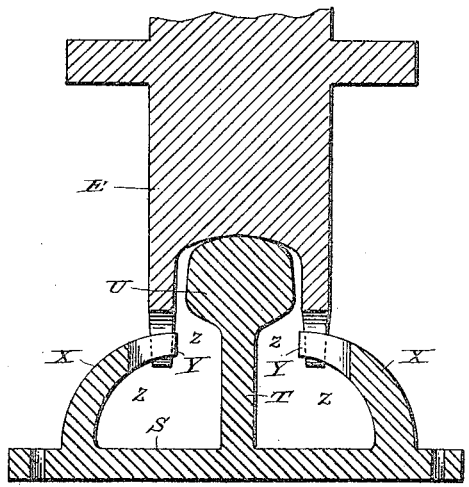

In the drawings, Figure 1 is a transverse sectional view through the framework, and associated parts, constituting the way within which a car may travel, the car being shown in elevation, Fig. 2 is an enlarged detail vertical sectional view of the rail and coöperating traction wheel, Fig. 3 is a side elevation of Fig. 2, Fig. 4 is a side view of the rail, and wheel, Fig. 5 is a view similar to Fig. 2, exhibiting a modified construction of the rail, and Fig. 6 is a like view of a further modified construction.

Referring more particularly to the drawings, wherein like reference characters designate corresponding parts in the several views, and first with reference to the first four figures, A represents the framework of a mono-railroad, the same being of approximately triangular formation; B is a car of any designed type adapted to pass through the frame; C are a pair of lateral rails extending along the frame; and D are yieldable buffer wheels or equivalent devices, not necessary to be specially defined therein, adapted normally to center the car, but permitting the same to yield under a cushioning influence when the car sways in rapid travel, and especially when rounding curves. The buffer wheels D traverse grooved portions of the rails C, as shown.

E represents the driving traction wheel supporting the car and arranged centrally thereof, and similarly centrally of the base portion of the framework in position to engage the correspondingly centrally disposed rail F. Of course, any number of traction wheels may be employed, in keeping with the requirements attending any particular service, or type of car, it being deemed sufficient to typify the same by the inclusion of but one wheel in this application. The traction wheel or wheels are driven through the medium of any known or preferred source of power.

The rail F is provided with a broad strong central portion G merging at its lower opposite edges into securing flanges H, utilized in fixedly securing the rail with reference to the framework in any practical and efficient manner. Projecting upwardly centrally of the rail is a broad rounded tread portion J, the same being smooth on its upper surface to receive the correspondingly shaped base K of the peripheral groove in the traction wheel E. At opposite sides of the tread J, the base portion G of the rail is curved downwardly and outwardly, as at L, and the sides of the tread portion are curved outwardly, as represented at M, to gradually merge into the curvature of the upper surfaces L, to which I have just referred. These upper surfaces L and the lower portions of the side walls of the tread member J are formed into similarly curved teeth N, adapted to constitute racks along the two sides of the said tread member located well below the head of the rail, and the traction wheel E is formed peripherally of its flanges O with marginal teeth P to convert said flanges into a double integral gear, as will be readily understood. The flanges are rounded, as shown, to dispense with corners at the opposite ends of the teeth. Here it is to be noted,—as appears from the illustrations of that embodiment of the invention now being described, and others to be later defined,—that the teeth P constitute what may be termed extensions of the customary wheel flanges, in that the toothed portions are, when engaging the racks, located entirely below the head of the rail, and away from possible sidewise contact with the side surfaces of the head, to the end that solid flange portions, as usual, are at all times presented to the said sides for the strength required of them, and further to prevent undue wear of the rail which would flow from rubbing contact of a serrated or broken flange therewith, as distinguished from the smooth lateral surface engagement of said rail with a continuous or unbroken flange.

From the construction thus far defined, it will be appreciated that when the traction wheel E traverses the usual smooth-tread rail, as shown in my prior patents, the flanges O will be free with reference to their peripheral portions, and relative to the securing flanges of the rail, so that the only bearing between the wheel and the rail will be on the top of the smooth tread and between the same and the smooth base portion K of the groove in the traction wheel, so that in passing over approximately level country or comparatively slight undulations the toothed portions of the wheel flanges perform no action, and all of the advantages incident to a smooth tread and smooth wheel accordingly preserved. When, however, severe or steep inclinations are encountered, it is my purpose to install suitable sections of the present improved type of rail to permit engagement of the gear portions of the traction wheel with the toothed racks, and thereby provide a positive interlocking connection and drive or traction between the wheel and the rail until the summit of the inclination is attained, when the car may pass on to other continuations of smooth rails, if desired. It will also be apparent from the disclosure herein made, that swaying of the car in turning curves on up grades, while effectually maintaining the double gear wheel in mesh with one of the racks, or both racks, as the case may be, is enabled by the curved or arc-shaped longitudinal formation of the teeth N of the racks and the teeth P of the traction wheel, it being noticed that as the wheel may tilt on the tread portion, the toothed flanges will simply shift by the wheel rocking on said tread as a pivot, and the intermeshing teeth changing their engaging position correspondingly and without becoming disengaged.

Provision to prevent clogging of the teeth of the racks may not be necessary, but should occasion therefor require, the base portion of the rail at points intermediate of the teeth of the racks may be provided with vertical openings Q passing through the base portion into which any accumulations of dirt may fall and escape, the openings Q flaring downwardly to facilitate the discharge therethrough and overcoming any tendency of the material passing therethrough to become wedged therein.

In Fig. 5, I have provided another arrangement for overcoming any tendency of accumulations to pack between the teeth of the racks, the result being accomplished, in this instance, by forming the racks in a transverse downwardly diverging relation, so that at opposite sides of the tread portion, the racks incline outwardly and downwardly, to the end that any material falling in the spaces between the teeth may work outwardly and fall at the sides of the rail. These inclined portions of the racks are illustrated at R.

In Fig. 6, I show still another formation which would be useful in keeping the teeth of the racks in a clear or clean condition. This form embraces a base S, having a centrally disposed upwardly projecting web T, on which the tread U is formed, and at points intermediate of the securing flanges W of the base portion and the web T, I form integrally with the base, upwardly and inwardly extended ledges X having horizontally disposed teeth Y, constituting the racks adapted to engage the gear-peripheries of the traction wheels. By this arrangement, ample spaces Z are left below the racks and between the base and web to permit any material tending to clog the teeth to fall thereinto. This particular type of structure also presents an arrangement which may be easily cleared of accumulations by the introduction of any suitable implement, adapted to that purpose, through the slots z between the tread U and the racks.

In Fig. 4, I have illustrated at 5, a portion of a smooth rail devoid of the racks, occupying an approximately horizontal plane, and running into an inclined rail portion at 6, provided with the racks.

While I have herein disclosed several convenient embodiments of my invention, it will be apparent that said invention is capable of embodiment in still other forms and devices, all as will appeal to persons skilled in the art to which this invention pertains.

I claim:

1. In a mono-railroad, a vehicle, a traction wheel therefor having a grooved peripheral portion and peripherally toothed flanges, and a rail having a tread portion adapted to enter the grooved portion of the wheel and oppositely disposed toothed ledges adapted to engage the peripherally toothed flanges of the wheel, the toothed flanges and the toothed ledges being rounded longitudinally of the teeth to permit the wheel to rock while maintaining intermeshing engagement, substantially as and for the purposes described.

2. In a mono-railroad, a vehicle, a traction wheel therefor having a grooved peripheral portion and peripherally toothed flanges, and a rail having a tread portion adapted to enter the grooved portion of the wheel and oppositely disposed toothed ledges adapted to engage the peripherally toothed flanges of the wheel, the tread portion and the base of the grooved portion of the wheel being smooth, the toothed flanges and the toothed ledges being rounded longitudinally of the teeth to permit the wheel to rock while maintaining intermeshing engagement, substantially as and for the purposes described.

3. In a mono-railroad, a vehicle, a traction wheel therefor having a grooved peripheral portion and peripherally toothed flange, and a rail having a rounded tread portion adapted to enter the peripheral grooved portion of the wheel to permit the wheel to rock thereon, and a toothed ledge adapted to be engaged by the peripherally toothed flange, the peripherally toothed flange and the toothed ledge being rounded to maintain intermeshing engagement in the varying positions of the wheel.

4. In a mono-railroad, a vehicle, a traction wheel therefor having a grooved peripheral portion and peripherally toothed flange, and a rail having a rounded tread portion adapted to enter the peripheral grooved portion of the wheel to permit the wheel to rock thereon, and a toothed ledge adapted to be engaged by the peripherally toothed flange, the peripherally toothed flange and the toothed ledge being rounded to maintain intermeshing engagement in the varying positions of the wheel, the tread portion and the base of the peripheral groove of the wheel being smooth, substantially as and for the purposes described.

5. In a mono-railroad, a vehicle, a traction wheel therefor having a grooved peripheral portion and peripherally toothed flange, a rail having a rounded tread portion adapted to enter the peripheral grooved portion of the wheel to permit the wheel to rock thereon, a toothed ledge adapted to be engaged by the peripherally toothed flange, the peripherally toothed flange and the toothed ledge being rounded to maintain intermeshing engagement in the varying positions of the wheel, the tread portion and the base of the peripheral groove of the wheel being smooth, and a portion of the rail being devoid of the toothed ledge, substantially as and for the purposes described.

6. In a mono-railroad, a vehicle, a traction wheel therefor having a grooved peripheral portion and peripherally toothed flange, a rail having a rounded tread portion adapted to enter the peripheral grooved portion of the wheel to permit the wheel to rock thereon, a toothed ledge adapted to be engaged by the peripherally toothed flange, the peripherally toothed flange and the toothed ledge being rounded to maintain intermeshing engagement in the varying positions of the wheel, the tread portion and the base of the peripheral groove of the wheel being smooth, and a portion of the rail being devoid of the toothed ledge, the last mentioned portion of the rail approximating a horizontal plane with reference to the toothed ledge portions thereof, which occupy a relatively ascending inclined plane, substantially as and for the purposes described.

7. The combination with a rail, of a wheel mounted to rock on the rail, a rack associated with the rail, and a complementary toothed portion mounted to rotate and rock in consonance with the movements of the wheel, said rack and toothed portion being formed and arranged to maintain intermeshing engagement during the rocking of the wheel on the rail, substantially as described.

8. The combination with a rail, of a wheel mounted to rock on the rail, a rack member associated with the rail, and a complementary toothed member mounted to rotate and rock in consonance with the movements of the wheel, one of said members being rounded longitudinally of the teeth thereof, substantially as described.

9. The combination with a rail, of a wheel mounted to rock on the rail, a rack member associated with the rail, and a complementary toothed member mounted to rotate and rock in consonance with the movements of the wheel, the rack member being concaved lengthwise of the teeth thereof, substantially as described.

10. The combination with a rail, of a wheel mounted to rock on the rail, a rack member associated with the rail, and a complementary toothed member mounted to rotate and rock in consonance with the movements of the wheel, the rack member being concaved lengthwise of the teeth thereof, and having outlet openings leading from the low central portions intermediate of the teeth, substantially as described.

11. The combination with a headed rail, of a wheel adapted to traverse the same, rack members associated with the rail and located below the head thereof, continuous flange portions on the wheel arranged to present at all times an unbroken surface for engagement with the side surfaces of the headed portion of the rail, and toothed peripheral portions on said flanges adapted to mesh with the racks, said teeth, in their meshed positions, being entirely below the headed portion of the rail, for the purpose set forth.

In testimony whereof I hereunto affix my signature in the presence of two witnesses.

THOMAS C. SPELLING.

Witnesses:
JOSEPH H. MILANS,
GEO. D. RILEY.

Copies of this patent may be obtained for five cents each, by addressing the "Commissioner of Patents, Washington, D. C."